US006925498B2

(12) United States Patent
Kujirai

(10) Patent No.: US 6,925,498 B2
(45) Date of Patent: Aug. 2, 2005

(54) INFORMATION PROCESSING SYSTEM, INFORMATION PROCESSING DEVICE, CONTROL METHOD THEREOF, MEMORY MEDIA HAVING STORED PROGRAMS THEREOF AND PROGRAM THEREOF

(75) Inventor: Yasuhiro Kujirai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 843 days.

(21) Appl. No.: 09/828,913

(22) Filed: Apr. 10, 2001

(65) Prior Publication Data

US 2001/0034773 A1 Oct. 25, 2001

(30) Foreign Application Priority Data

Apr. 14, 2000 (JP) ........................................ 2000-113955
Mar. 19, 2001 (JP) ........................................ 2001-078837

(51) Int. Cl.[7] .......................................... G06F 15/173
(52) U.S. Cl. ...................... 709/225; 709/229; 709/250; 709/238; 709/204; 709/217; 709/205; 399/366; 358/462; 380/51
(58) Field of Search ............................... 709/204, 217, 709/205, 225, 229, 250, 238; 399/366; 358/462; 380/51; 705/52

(56) References Cited

U.S. PATENT DOCUMENTS 5,444,779 A    8/1995   Daniele ......................... 380/3
5,530,520 A  * 6/1996   Clearwater .................. 399/366
5,845,281 A   12/1998   Benson et al. ................. 707/9
5,910,987 A  * 6/1999   Ginter et al. ................. 705/52
5,982,891 A  * 11/1999  Ginter et al. ................. 705/54
6,006,332 A   12/1999   Rabne et al. ............... 713/201
6,202,056 B1 * 3/2001   Nuttall ........................ 705/52
6,253,193 B1 * 6/2001   Ginter et al. ................. 705/57

FOREIGN PATENT DOCUMENTS

JP         09101988 A  *  4/1997   .......... G06F/17/60
WO      WO 97/25798       7/1997

OTHER PUBLICATIONS

Bartolini, F. et al. "Electronic Copyright Management Systems: Requirements, Players and Technologies" Sep. 1999, Proceedings, Tenth International Workshop on Database and Expert Systems Applications.*

* cited by examiner

*Primary Examiner*—Anthony Knight
*Assistant Examiner*—Thomas Pham
(74) *Attorney, Agent, or Firm*—Fitzpatrick, Cella Harper & Scinto

(57) ABSTRACT

When printing output data that become output objects, copyright data attached to the corresponding said output data or information on copyright managed by a copyright managing device are selectively used to execute a print processing of said output data.

This allows the output process to be executed based on the copyright information best suited for the corresponding output data.

9 Claims, 11 Drawing Sheets

Print=Yes ;
Resolution=72—300 ;
Coupons=15 ;
Charge=4.75 ;

| USER'S NAME | CHARGE STATUS |
|---|---|
| A | 13.75 |
| B | 2.25 |
| C | 5.10 |

INFORMATION PROCESSING SYSTEM, INFORMATION PROCESSING DEVICE, CONTROL METHOD THEROF, MEMORY MEDIA HAVING STORED PROGRAMS THEREOF AND PROGRAM THEREOF

BACKGROUND OF THE INVENTION

1. Field of the Invention

The present invention relates to, for example, an information processing system, an information processing devices, a control method thereof, and a memory medium that has stored processing steps for executing the method so that a computer can read out, for use in a device and a system for outputting information including copyright information.

2. Related Background Art

Heretofore, for example, in a CD in which music data (electric data) are stored, in order to protect the copyright of the music, the scheme and so forth have been established in which duplication to a grandson generation is prohibited.

However, as for copyright concerning printed matters, duplication thereof and so forth are possible in the area on which a copyright owner has no influence, and there is a problem that the copyright is not always protected.

SUMMARY OF THE INVENTION

In an example of the present invention, it is an objectivity to solve the above-mentioned tasks, when printing output data that become the output objects, by selectively using information on the copyright managed by a copyright management device or copyright data attached to the corresponding output data to execute a print processing of the corresponding output data.

Other objects and features of the present invention will become more apparent upon a reading the following specification and drawings.

DETAILED DESCRIPTION OF THE PREFERRED EMBODIMENTS

Hereinafter, an embodiment of the present invention will be explained by use of the drawings.

(A Whole Configuration of the Present Embodiment)

Figure 1:
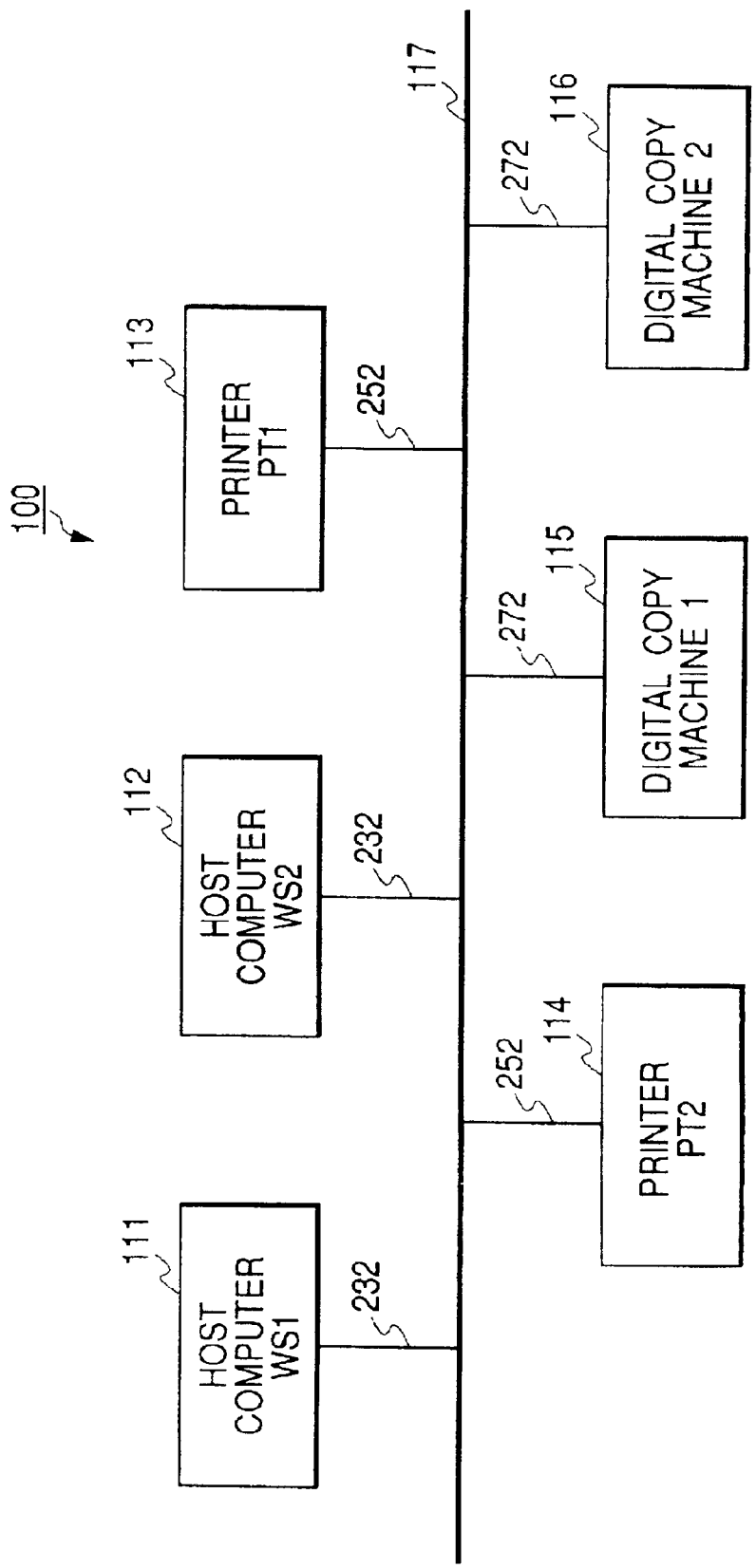
FIG. 1 is a block diagram illustrating a configuration of an information processing system in which the present invention finds application.

The present invention finds application, for example, in an information processing system 100 shown in FIG. 1. In the information processing system 100, as shown in the above-mentioned FIG. 1, is given the configuration in which a host computer (WS 1) 111, a host computer (WS 2) 112, a printer (PT 1) 113, a printer (PT 2) 114, a digital copying machine (1) 115, and a digital copying machine (2) 116 are connected via an local network 117 (hereinafter, also referred to as a network 117 for simplicity) so that each thereof can communicate with the other.

In addition, in the above-mentioned FIG. 1, for simple explanation, the configuration is given in which each two of the host computers, the printers, the digital copying machines are adapted to connect over the network 117 respectively, however the connection number is not limited thereto.

As with physical specifications and access procedures of the network 117, for example, in addition to a token bus method specified in "IEEE 802.4", a "STAR Network" having a physical topology with a star shape specified in "IEEE 802.3 10 BASE 5" or a token ring method specified in "IEEE 802.5" are applicable.

Also, as with a network operation system that causes the network 117 to function, for example, "Net Ware V3.1" (manufactured by Nobel) for use in a MS-DOS operating system, a MAC and so forth, or "Network Lan Manager V2.11" for use in IBM-manufactured computers and so forth, and so forth are applicable.

(A Hardware Configuration of the Host Computers 111 and 112)

Figure 2:
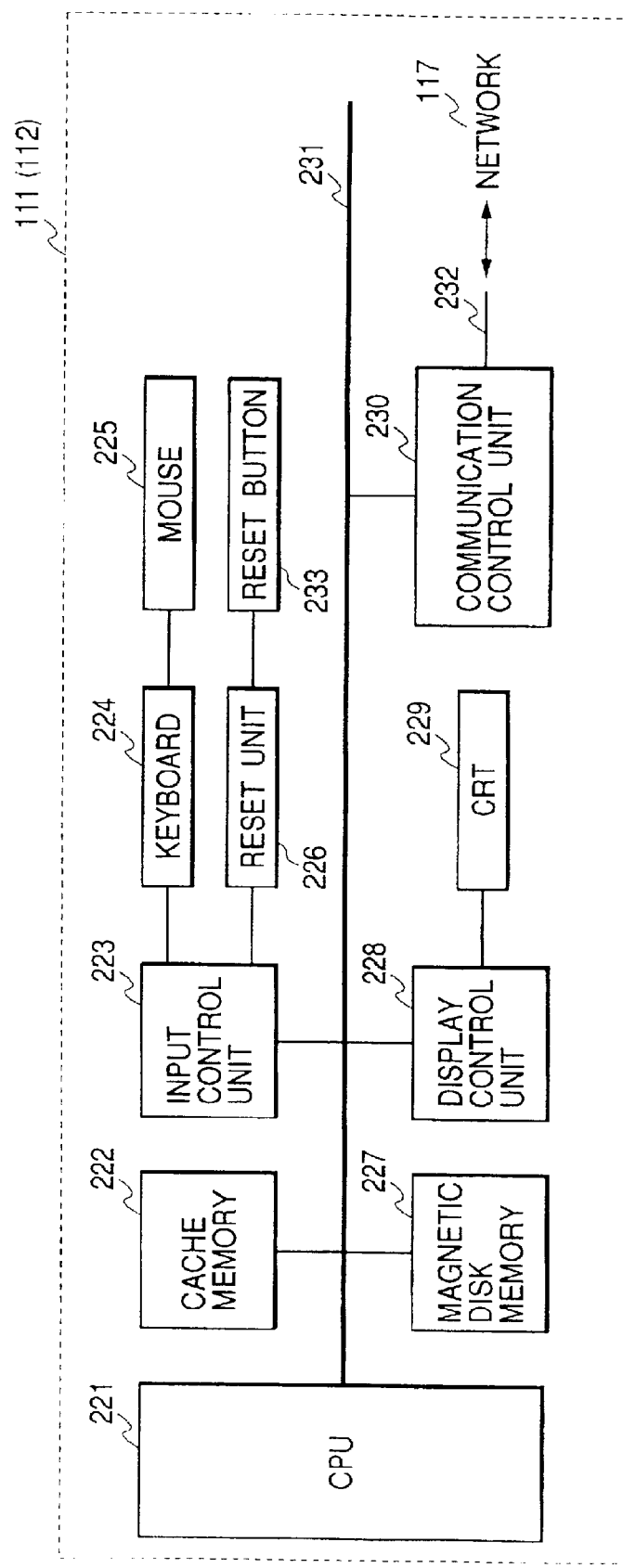
FIG. 2 is a block diagram illustrating a hardware configuration of a host computer in said information processing system.

Each of the host computer (WS1) 111 and the host computer (WS2) 112 is configured similarly, and for example, as shown in FIG. 2, the host computer 111 includes a CPU 221 for governing the host computer in its entirety, a cache memory 222 that is a fast-access memory for storing various kinds of data, application software programs and so forth, a magnetic disk memory 227 that is employed as a large scale memory for use mainly in the application software programs, a keyboard 224 and a mouse 225 for inputting data, commands and so forth of text editor, program development and so forth, a reset unit 226 for initializing the CPU 221, the application software programs and so forth, an input controller 223 for controlling the input from the keyboard 224, the mouse 225 and the reset unit 226, a CRT 229 for displaying, a display controller 228 for controlling the display on the CRT 229, and a communication controller 230 for carrying out the connection to the network 117.

And, each of the CPU 221, the cache memory 222, the input controller 223, the magnetic disk memory 227, the display controller 228 and the communication controller 230 is connected to the other via a data bus 231 so that each thereof can transmit/receive the data to/from the other.

In the host computer 111 (112) described above, at first, the CPU 221 controls the operations of the host computer in its entirety via the data bus 231 by directly accessing the cache memory 222, the magnetic disk memory 227, the CRT 229 and so forth, or by accessing them via their controller.

The controller 223 supplies to the CPU 221 the signals that are based on the operations by a user in the mouse 225 for executing selection of an icon on the display screen of the CRT 229 that serves as display means, the keyboard 224 for inputting data, commands and so forth, the reset button 233, and so forth.

Herein, for example, when a main power source is switch on in the host computer 111, or when a reset button 233 attached to the main frame of the host computer 111 is pressed down, the reset unit 226 is adapted to generate the signals (reset signals) for initializing the CPU 221, the application software being executed in the CPU, and so forth to supply them to the input controller 223.

Accordingly, it enables initialization of the CPU 221, the application software being executed in the CPU 221, and so forth to be carried out that the input controller 223 supplies the corresponding reset signals to the CPU 221.

In addition, the reset button 233, as shown in the above-mentioned FIG. 2, may be mounted as a separate button, or may be adapted to share an optional switch out of a group of switches in the keyboard 224, for example, a STOP key or a main reset button of the host computer.

The display controller 228 develops the display data supplied from the CPU 221 into the data (pixel data) that are possible to display on the CRT 229 to generate the video data.

Accordingly, in the CRT 229, the image data based on the video data generated in the display controller 228 are to be displayed.

The communication 230 receives/transmits the data via a interface 232 from/to each of the appliances (the printers 113 and 114, the digital coping machines 115 and 116, and so forth) connected over the network 117 under control of the network operating system causing the above-subscribed network 117 to function.

In addition, even though the configurations of the host computer (WS1) 111 and the host computer (WS2) 112 are the same definitely, if addresses thereof are different over the network 117, it is possible to simultaneously operate these two host computers 111 and 112.

(A Hardware Configuration of the Printers 113 and 114)

Figure 3:
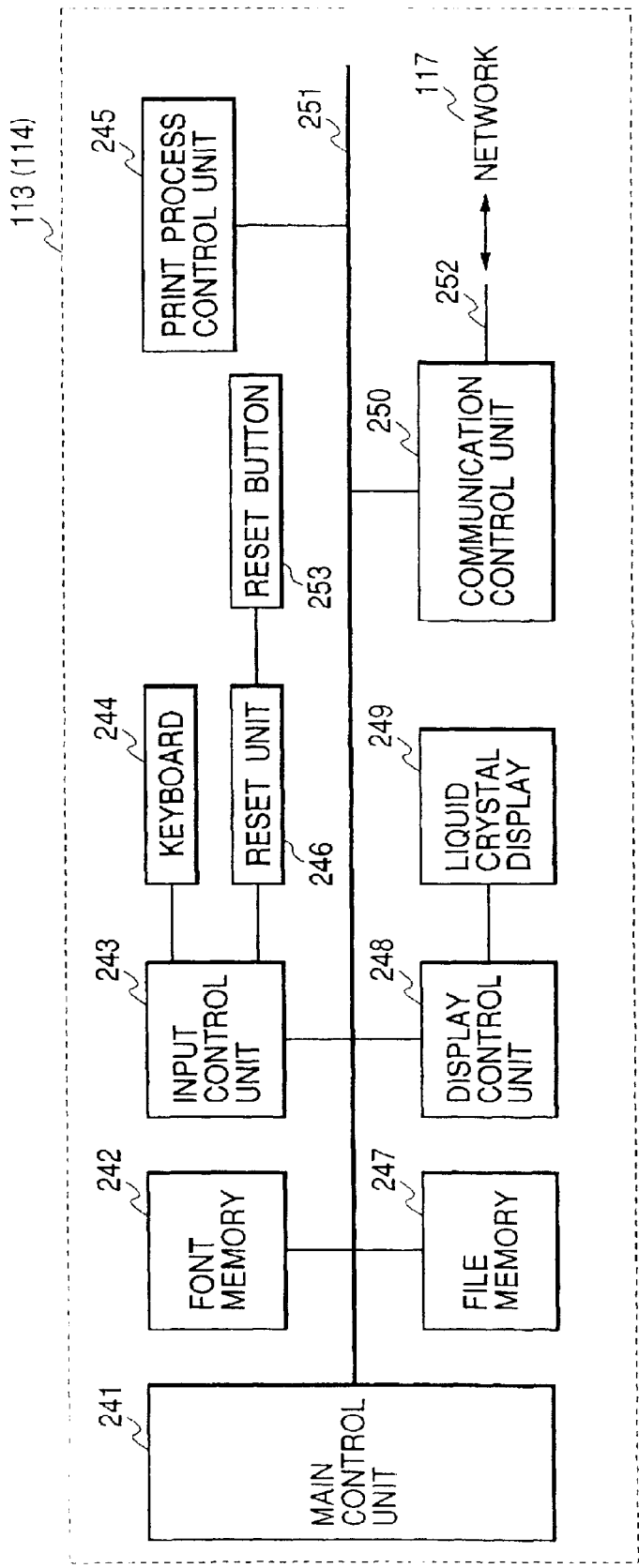
FIG. 3 is a block diagram illustrating a hardware configuration of a printer in said information processing system.

Each of the printer (PT1) 113 and the printer (PT2) 114 are configured similarly and, for example, as shown in FIG. 3, the printer 1113 comprises a main controller 241 for governing the printer in its entirety, a print processing controller 245 for controlling electrostatic copying processing utilizing a laser light, a communication controller 250 for receiving the print data via the network 117, a file memory 247 for temporarily storing the print data received from the communication controller 250, a font memory 242 for developing the print data within the file memory 247 into the printable data, a keyboard 244 for inputting various kinds of data and commands and so forth, a reset unit 246 for initializing the main controller 241, the application software and so forth, an input controller 243 for controlling the input from the keyboard 244 and the reset unit 246, a liquid crystal indicator 249 for displaying, and a display controller 248 for controlling the display in the liquid crystal indicator 249.

And, each of the main controller 241, the print processing controller 245, the font memory 242, the input controller 243, the file memory 247, the display controller 248, and the communication controller 250 is connected to the other via the data bus 251 so that each thereof can receive/transmit the data from/to the other.

In the printer 113 (114) as described above, at first, the main controller 241 is configured to include the CPU, the program memory, the data memory and so forth, and governs the operation control of the printer in its entirety by this configuration.

For example, the main controller 241 receives via the network interface 252 and the communication controller 250 the print data sent from the host computer 111 or 112 via the network 117 and executes data processing such as development of the corresponding print data according to a page description language (PDL) and so forth to carry out the printer control for the printing operation together with the processing control (the control of the print processing controller 245) for printing on the papers the data obtained in the corresponding data processing.

The input controller 243 supplies to the main controller 241 the signals based on the operation by the user in the keyboard 244 or the mouse (not shown) and so forth for inputting the data, the commands and so forth such as execution of the print processing (print execution), retrieval of the file executing the print process, or the interface initial set of the edit or the printer, or so forth.

Herein, for example, when the main power source is switch on in the printer 113, or when the reset button 253 attached to the main frame of the printer 113 is pressed down, the reset unit 246 is adapted to generate the signals (reset signals) for initializing the main controller 241, the application software being executed in the CPU of the main controller 241, and so forth to supply them to the input controller 243.

Accordingly, it enables initialization of the main controller 241, the application software being executed in the CPU of the main controller 241, and so forth to be carried out that the input controller 243 supplies the corresponding reset signals to the main controller 241.

In addition, the reset button 253, as shown in the above-mentioned FIG. 3, may be adapted to be mounted as a separate button, or may be adapted to share an optional switch out of a group of switches in the keyboard 224, for example, a STOP key or a main reset button of the host computer.

The display controller 248 displays the data from the main controller 241 by the crystal liquid indicator 249.

For example, the controller 248 displays by the crystal liquid indicator 249 the data and the commands that are input from the keyboard 244, or the status of the printer 113, which are supplied from the main controller 241.

The communication controller 250 receives/transmits the data via the interface 252 from/to each of the appliances (the host computers 111 and 112, and so forth) connected over the network 117 under control of the network operating system causing the above-described network 117 to function.

In addition, even though the configurations of the printer (PT1) 113 and the printer (PT2) 114 are the same definitely, if addresses thereof are different over the network 117, it is possible to simultaneously operate these two printers 113 and 114.

(A Hardware Configuration of the Digital Copying Machines 115 and 116)

Each of the digital copying machine (1) 115 and the digital copying machine (2) 116 comprises the copying machine function and the printer function as shown in the above-mentioned FIG. 3 respectively.

Figure 4:
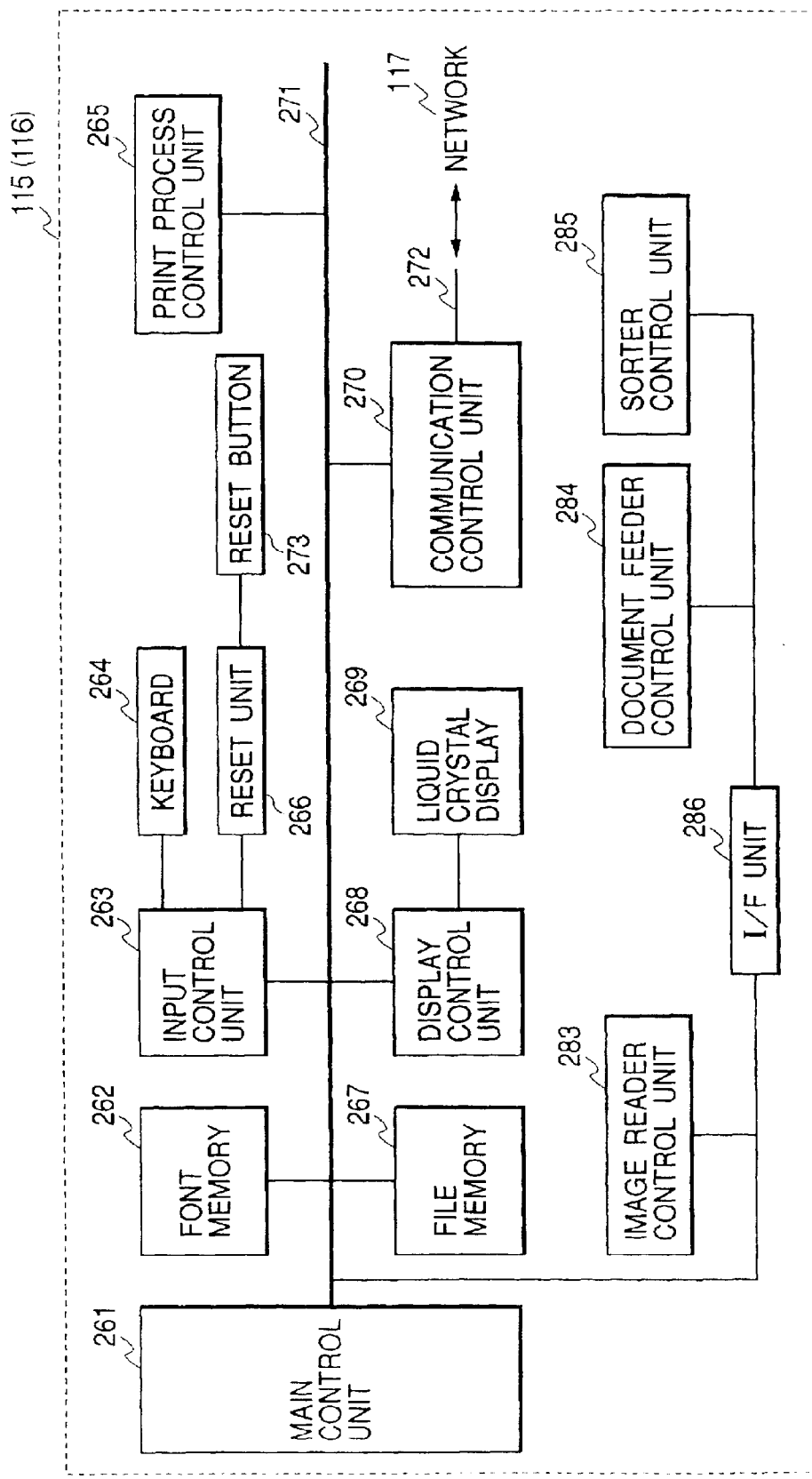
FIG. 4 is a block diagram illustrating a hardware configuration of a digital copying machine in said information processing system.

For this reason, the digital copying machine 115 is configured to comprises, for example, as shown in FIG. 4, configuration units 261 to 273 that function in a similar way to the configuration units 241 to 253 shown in the above-mentioned FIG. 3 and to simultaneously comprise an image reader controller 283, a document feeder controller 284, a sorter controller 285 and an interface 286.

In case that the digital copying machine 115 (116) as described above is employed as the copying machine, upon manuscripts being set at an automatic manuscript transfer unit (not shown) mounted on a manuscript desk and upon a print button on the keyboard 264 being pressed down, the digital copying machine 115 (116) commences the following copying operations according to the preset copying processing procedure.

At first, the document feeder controller 284 executes the control for transferring the manuscripts on said automatic manuscript transfer unit to an image reader (image reading unit, not shown).

Next, the image reader controller 283 temporarily stores as the image data into the file memory 267 the information of the manuscripts transferred to said image reader by the control of the document feeder controller 284 and executes the control for supplying the corresponding image data to the print processing controller 265 for controlling the electrostatic copying processing utilizing a laser light.

Accordingly, by the print processing controller 265, the image based on the corresponding to the image data is to be transcribed and formed on the papers.

Next, the sorter controller 285 executes the control for delivering from a sorter (not shown) the papers (transcript papers) on which the image is transcribed and formed by the print processing controller 265.

Also, upon finishing the volumes set by the keyboard 264 in the foregoing copying operation (completion of copying), the sorter controller 285 executes the post-processing control such as a staple (a Hotchkiss clamping process) set by the keyboard 264 and so forth.

On the other hand, in case that the digital copying machine 115 (116) is employed as the printer, the digital copying machine 115 (116) functions in a similar way to the operation described by use of FIG. 3 in the above-mentioned (a hardware configuration of the printers 113 and 114).

Namely, the main controller 261 executes the control for receiving the print data from the network 117 by the communication controller 270, for temporarily storing the corresponding data into the file memory 267 and for developing the print data within the file memory 267 into the printable data in the font memory 262.

The sorter controller 285 executes the control for delivering from the sorter (not shown) the papers printed by the above-mentioned control in the main controller 261.

Also, upon finishing the volumes set by the keyboard 264 or the host computers 111 and 112 in the above-mentioned copying operation (completion of copying), the sorter controller 285 executes the post-processing control such as the staple set by the keyboard 264 or the host computers 111 and 112, and so forth.

As described above, in order to realize the printer function as well together with the copying function in the digital copying machine 115 (116), in case that the digital copying machine 115 (116) is functioning as the printer, the main controller 261 receives via the network interface 272 and the communication controller 270 the print data sent from the host computers 111 or 112 via the network 117, executes data processing such as development of the corresponding print data responding to the page description language (PDL) and so forth, and executes the printer control for the printing operation (sorting of the papers, and the control including the post process) together with the processing control (the control of the print processing controller 265) for printing on the papers the data obtained by the corresponding data processing.

Also, in case that the digital copying machine 115 (116) is functioning as the copying machine, the main controller 261 controls the automatic transcript transfer unit (not shown) by the document feeder controller 284, simultaneously reads out the image data of the transcript in the said automatic transcript transfer unit by the image reader controller 283, and executes the processing control for the print processing while executing image processing such as graduation processing of the corresponding image data and so forth, and the printer control for the printing operation (sorting of the papers, and the control including the post process).

Also, from the keyboard 264, the commands are input indicating either that the digital copying machine 115 (116) is caused to function as the printer (printer mode) or that the digital copying machine 115 (116) is caused to function as the copying machine (copying machine mode). The input controller 263 supplies to the main controller 261 the commands input from the keyboard 264. Thereby, the main controller 261 switches each operation in the copying machine function and in the printer function as described above based on the command modes from the input controller 263.

Also, the keyboard 264 includes the function in which the data and the commands are possible to input such as retrieve and edit of the files, or the interface initial set of the digital copying machine 115 (116), or so forth when in the printer mode, and the function in which the commands and the data are possible to input that indicate the number of copying sheets, switching of single side/two sides, switching of expansion/reduction, a copying concentration set, a sorting mode set, with or without executing of the staple, copying commencement and so forth when in the copying machine mode.

In addition, the mouse (not shown) and so forth might be adapted to carry out the various inputting operations in the keyboard 264. Also, even though the configurations of the digital copying machine (1) 115 and the digital copying machine (2) 116 are the same definitely, if addresses over the network 117 are different, it is possible to simultaneously operate these digital copying machines 115 and 116.

(A Software Configuration of the Host Computers 111 and 112)

Figure 5:
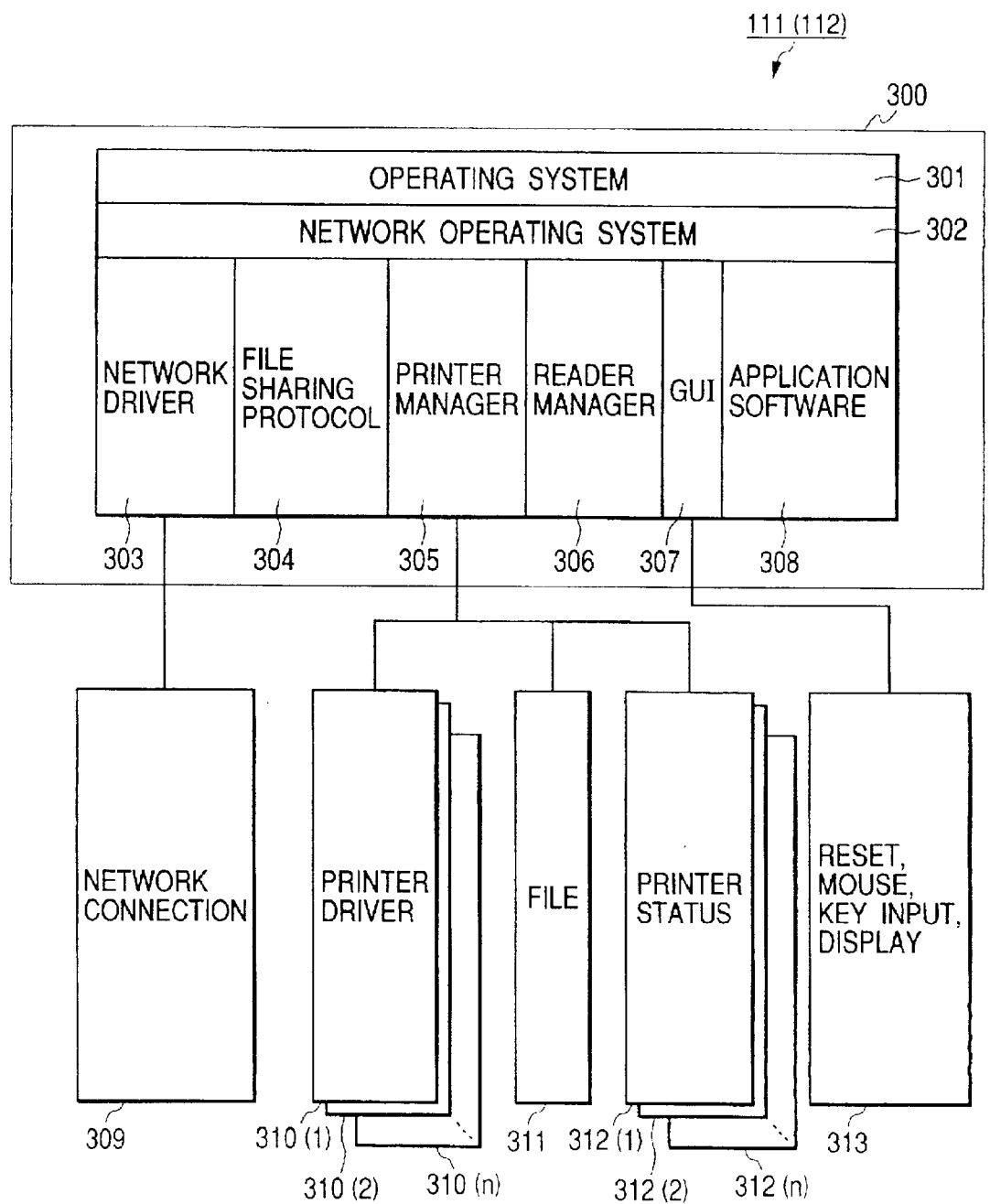
FIG. 5 is a block diagram illustrating a software configuration of a host computer in said information processing system.

Each of the host computer (WS1) 111 and the host computer (WS2) 112, for example, includes the software configuration as shown in FIG. 5.

The operating system and the various kinds of application software shown in the above-mentioned FIG. 5 are stored into the magnetic disk memory 227 that serves as a large-scale memory shown in the above-mentioned FIG. 2.

Specifically, as shown in the above-mentioned FIG. 5, software 300 includes an operating system 301, a network operating system 302, the various kinds of application software, and a driver software group 303 to 308.

The operating system 301 executes the hardware-manner control of the host computer 111 (112) and switches execution of the application software 308.

The network operating system 302 is for executing the hardware-manner control of the network 117, which also becomes a nucleus of the communication control.

For example, the network operating system 302 receives/sends the data based on theoretical network addresses over the network 117. Also, the network operating system 302 absorbs the packet data addressed to itself (addressed to the host computer 111 (112)) over the network 117.

In the software group 303 to 308, network driver software 303 executes the control for exchanging the data, the messages and so forth among the application software of the various appliances connected over the network 117 (the control for a network connection 309).

A file share link protocol 304 builds the data (the application software 308, the printer driver software 310 and so forth) obtained via the network driver software 303 into the real machine (the host computer 111 (112)) and assigns virtual drives necessary for the corresponding data (the application software 308 and so forth).

A printer manager 305 manages the status (printer status) information 312 (1), 312 (2), ..., 312(n) such as the printer status, the function, the additional function, a name of the model and so forth in the printers 113 and 114 or in the digital copying machines 115 and 116 connected over the network 117. Also, the printer manager 305 drives the predetermined printer in some cases and drives printer drivers 310 (1), 310 (2), ..., 310(n) for developing the PDL data for the determined printer in the other cases. In addition, the printer driver 310 includes a print function information acquisition unit 701 of FIG. 10 to be described later, and a user sets the printing conditions of the print data 600 in advance based on the function information of the printer 113 being controlled by the print function information acquisition unit 701.

Further, the printer manager 305 manages a print file 311 including the print data that are to be printed.

The processing result and the status information by the printer manager 305 are displayed (313) on the CRT 229 via a GUI (Graphical User Interface) 307.

A reader manager 306 manages the status information such as the status, the function, the additional function, the model name of the reader and so forth in the digital copying machines 115 and 116 over the network 117.

Also, the reader manager 306 drives each of the readers in some cases, and drives the reader driver software for loading the image data into each of the readers in the other cases.

Also, the reader manager 306 manages the files including the image data that are to be memorized.

The processing result and the status information by the reader manager 306 are displayed (313) on the CRT 229 via the GUI 307 in a similar manner to the processing result and the status information by the printer manager 305.

(A Software Configuration of the Printers 113 and 114)

Figure 6:
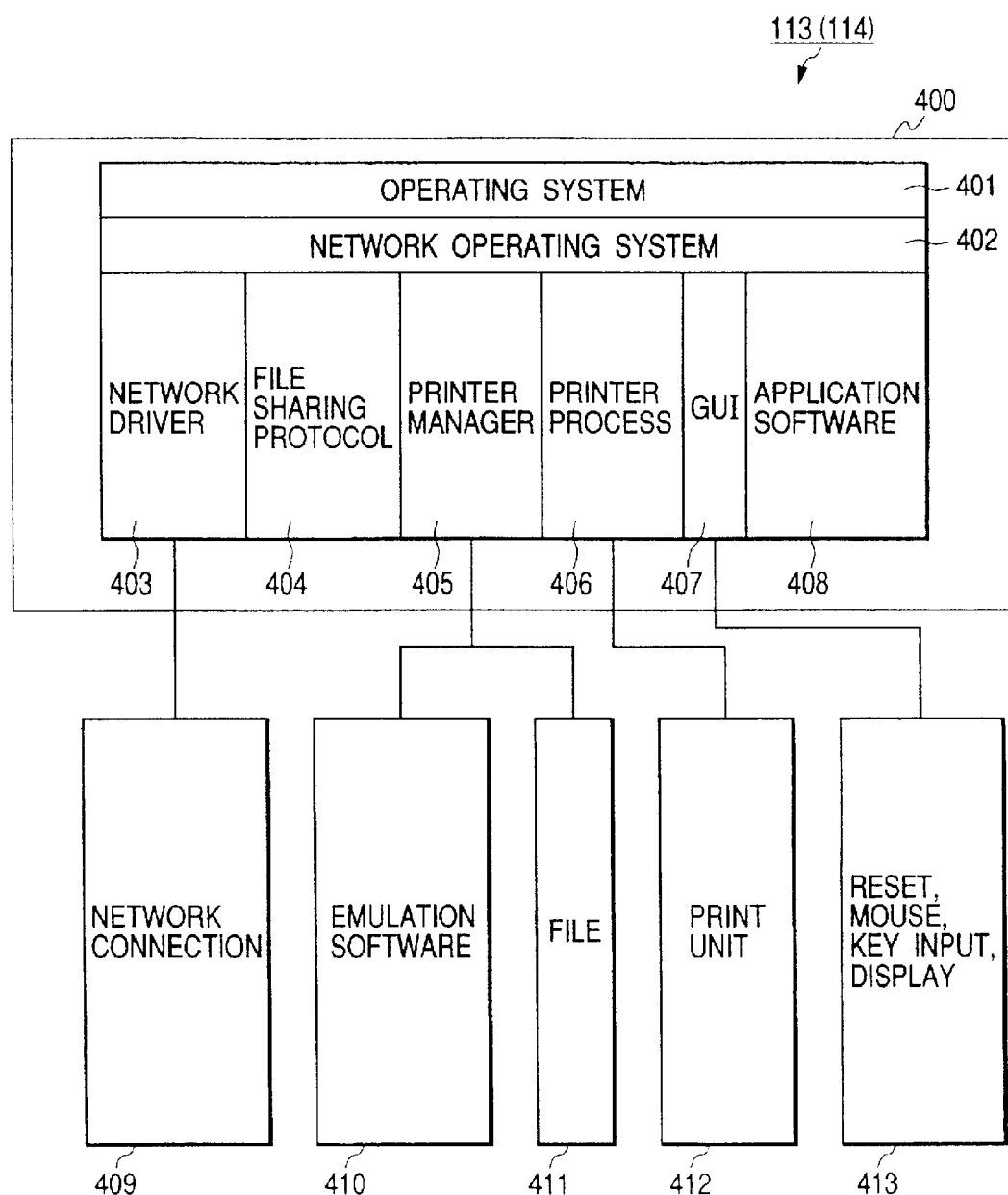
FIG. 6 is a block diagram illustrating a software configuration of a printer in said information processing system.

Each of the printer (PT1) 113 and the printer (PT2) 114, for example, includes the software as shown in FIG. 6.

The operating system and the various kinds of application software shown in the above-mentioned FIG. 6 are stored into the memory within the main controller 241 shown in the above-mentioned FIG. 3.

Specifically, as shown in the above-mentioned FIG. 6, software 400 includes an operating system 401, a network operating system 402, the various kinds of application software, and a driver software group 403 to 408 in a similar manner to the software configuration of the host computer 111 (112) shown in the above-mentioned FIG. 5.

The operating system 401 carries out the hardware-manner control of the printer 113 (114) and switches execution of the application software 408.

The network operating system 402 is for executing the hardware-manner control of the network 117, which also becomes a nucleus of the communication control. For example, the network operating system 402 receives/sends the data based on theoretical network addresses over the network 117. Also, the network operating system 402 absorbs the packet data addressed to itself (addressed to the printer 113 (114)) over the network 117.

In the software group 403 to 408, the network driver software 403 executes the control for exchanging the data, the messages and so forth among the application software of the various appliances connected over the network 117 (the control for a network connection 409).

A file share link protocol 404 builds the data (the application software 408, the printer driver software and so forth) obtained via the network driver software 403 into the real machine (the printer 113 (114)) in some cases, and assigns the virtual drives necessary for the corresponding data (the application software 408 and so forth) in other cases.

A printer manager 405 returns the status information such as the status, the function, the additional function, the model name of the printer 113 (114) responding to the request by the host computers 111 and 112 connected over the network 117, the other terminals (terminals on a client side) and so forth and sends the corresponding status information at a predetermined timing to the host computers 111 and 112 connected over the network 117 and the other terminals (terminals on a client side) and so forth in the other cases.

Also, the printer manager 405 stores as the file 411 into the file memory 247 the print data from the host computers 111 and 112 connected over the network 117 and the other terminals (terminals on a client side) and so forth in some cases, and controls emulation software 410 for converting the corresponding print data into the printable data, and the printer driver software for developing the PDL data for the various printers in the other case.

A printer process 406 executes the control for printing in a print unit 412 the print data within the file 411 that are to be printed, which are stored by the printer manager 405.

The processing result and the status information by the printer process 406 are displayed (413) on the liquid crystal indicator 249 via the GUI 407.

(A Software Configuration of the Digital Copying Machines 115 and 116)

Figure 7:
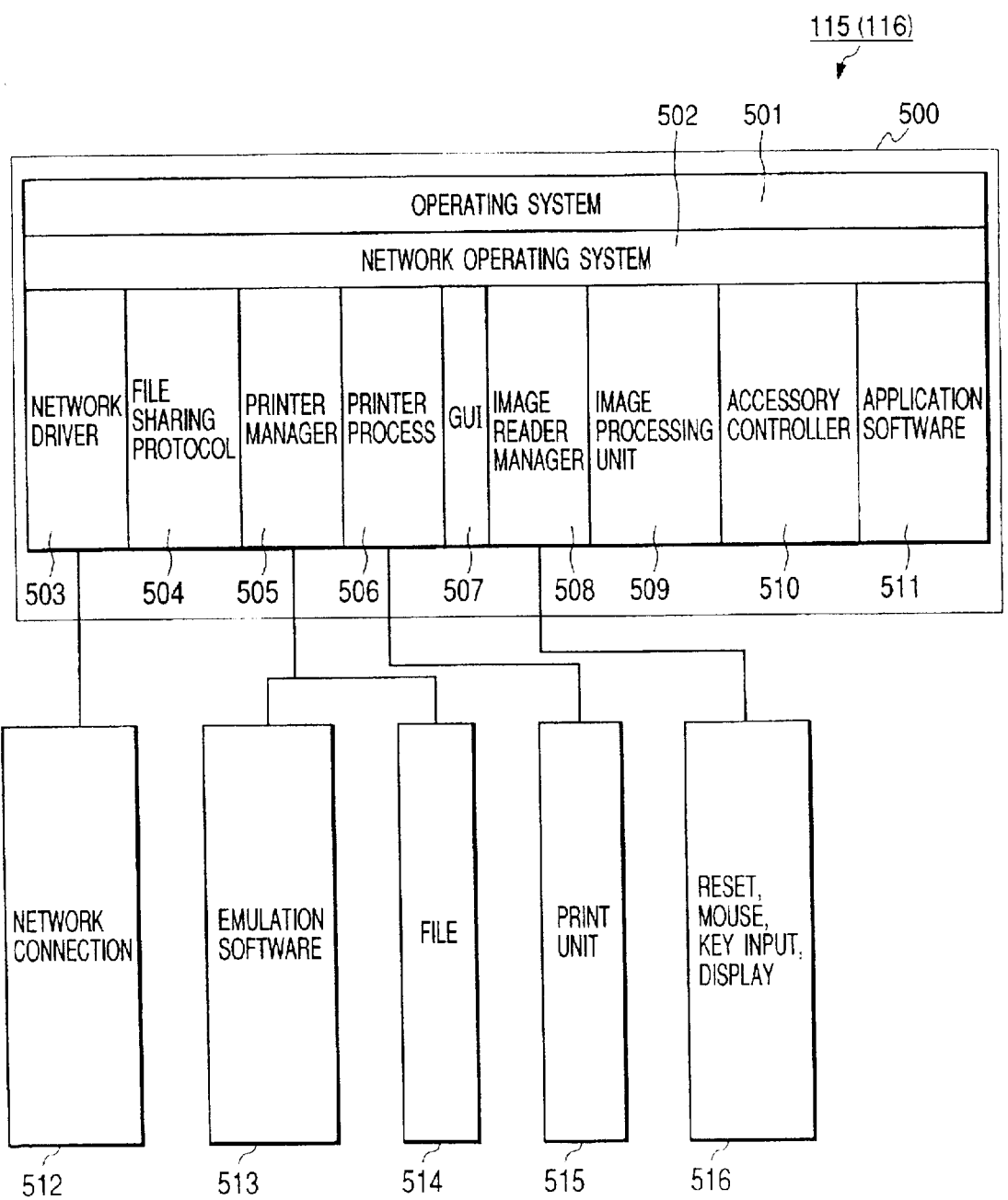
FIG. 7 is a block diagram illustrating a software configuration of a digital copying machine in said information processing system.

Each of the digital copying machine (1) 115 and the digital copying machine (2) 116, for example, includes the software as shown in FIG. 7.

The operating system and the various kinds of application software shown in the above-mentioned FIG. 7 are stored into the memory within the main controller 261 shown in the above-mentioned FIG. 4.

Specifically, as shown in the above-mentioned FIG. 7, software 500 includes an operating system 501, a network operating system 502, various kinds of application software, and a driver software group 503 to 511 in a similar manner to the software configuration of the host computer 111 (112) shown in the above-mentioned FIG. 5.

The operating system 501 executes the hardware-manner control of the digital copying machine 115 (116) and switches execution of the application software 511.

The network operating system 502 is for executing the hardware-manner control of the network 117, which also becomes a nucleus of the communication control. For example, the network operating system 502 receives/sends the data based on theoretical network addresses over the network 117. Also, the network operating system 502 absorbs the packet data addressed to itself (addressed to the digital copying machine 115 (116)) over the network 117.

In the software group 503 to 511, network driver software 503 executes the control for exchanging the data, the messages and so forth among the application software of the various appliances connected over the network 117 (the control for a network connection 512).

A file share link protocol 504 builds the data (the application software 511, the printer driver software and so forth) obtained via the network driver software 503 on the real machine (the digital copying machine 115 (116)) and assigns the virtual drives necessary for the corresponding data (the application software and so forth).

A printer manager 505 returns the information such as the status, the function, the additional function, the model name of the digital copying machine 115 (116) responding to the request by the host computers 111 and 112 connected over the network 117, the other terminals (terminals on a client side) and so forth, and sends the corresponding status information at a predetermined timing to the host computers 111 and 112 connected over the network 117 and the other terminals (terminals on a client side) and so forth.

Also, the printer manager 505 stores as the file 514 into the file memory 267 the print data from the host computers 111 and 112 connected over the network 117 and the other terminals (terminals on a client side) and so forth, and controls emulation software 513 for converting the corresponding print data into the printable data, and the printer driver software for developing the PDL data for the various printers.

A printer process 506 executes the control for printing in a print unit 515 the print data that are to be printed in the file 514 which are stored by the printer manager 505.

The processing result and the status information by the printer process 506 are displayed (516) on the liquid crystal indicator 269 via the GUI 507.

An image reader manager 508 controls the document feeder (the document feeder controller 284) by an accessory controller 510 and executes the control for reading out the information (image data) of the transcripts transferred from the corresponding document feeder.

Also, the image reader manager 508 executes nose elimination processing by the image processing unit 509 of the above-mentioned data to prepare the print data (image reader files).

Also, the image reader manager 508 executes the control for directly printing the print data (image data) on the papers by the print unit 515 and for preparing the predetermined volumes of the print matters sorted in the sorter and so forth based on the set form from the user by the keyboard 264 of the digital copying machine 115 (116) and so forth.

(An Operation of the Information Processing System 100)

Herein, the operation of the information processing system 100 will be explained at the time of the print processing of the print data including the copyright data.

Figures 8, 9:
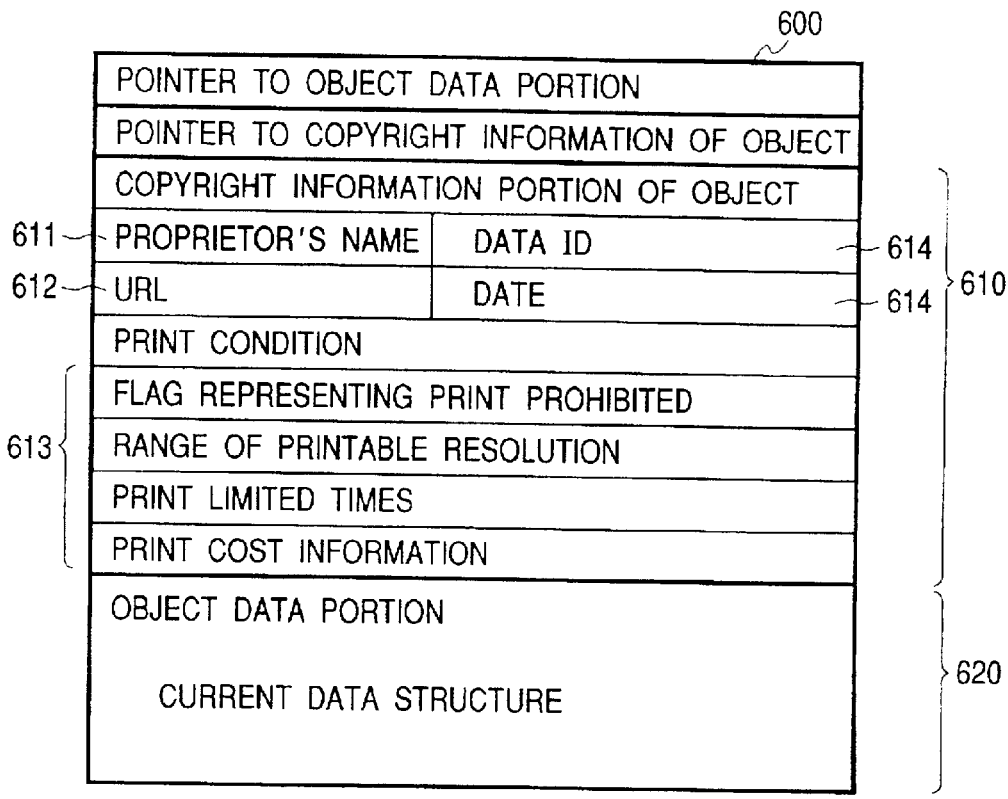
FIG. 8 is a diagram explaining an example of a print data format in said information processing system.
FIG. 9 is a diagram explaining another example of copyright data being included in said print data.

FIG. 8 illustrates an example of the print data 600 that become the print objects in the host computer 111 (112).

As shown in the above-mentioned FIG. 8, the print data 600 in accordance with the present embodiment has the copyright data 610 of the corresponding image data attached to the actual data 620 (object data, herein referred to the image data) to be printed.

In addition, the image data 620 that become the print objects might be, for example, the font data, the pattern data and so forth.

A domain of copyright data 610, specially, includes a domain (copyright owner name domain) 611 in which the information of the name of the copyright owner having the copyright of the image data has been set, a domain (URL domain) 612 in which the URL information has been set designating location sites of the information on the copyright over the network 117 or location sites of an acquisition method of the information on the copyright, a printing conditions domain 613 in which the printing conditions of the image data 620 have been set, and a data ID 614 assigned for the copyright owner to be able to specify the image data 620. Also, in a date domain 615, the final updated date or the effective limit date of the copyright data 610 have been set.

In the copyright owner name domain 611, is set the information of the copyright owner name having the copyright of the image data 620.

In the printing conditions domain 613, is set the information on the printing conditions of the image data 620 such as a "flag as to whether or not DO NOT PRINT", a "printable resolution range", a "printing restriction number", "print compensation information" and so forth.

In addition, as with the form by which the information is set to the printing conditions domain 613, it is not limited to the array expression as shown in the above-mentioned FIG. 8, and for example, may be the language form shown in the above-mentioned FIG. 9.

Figure 10:
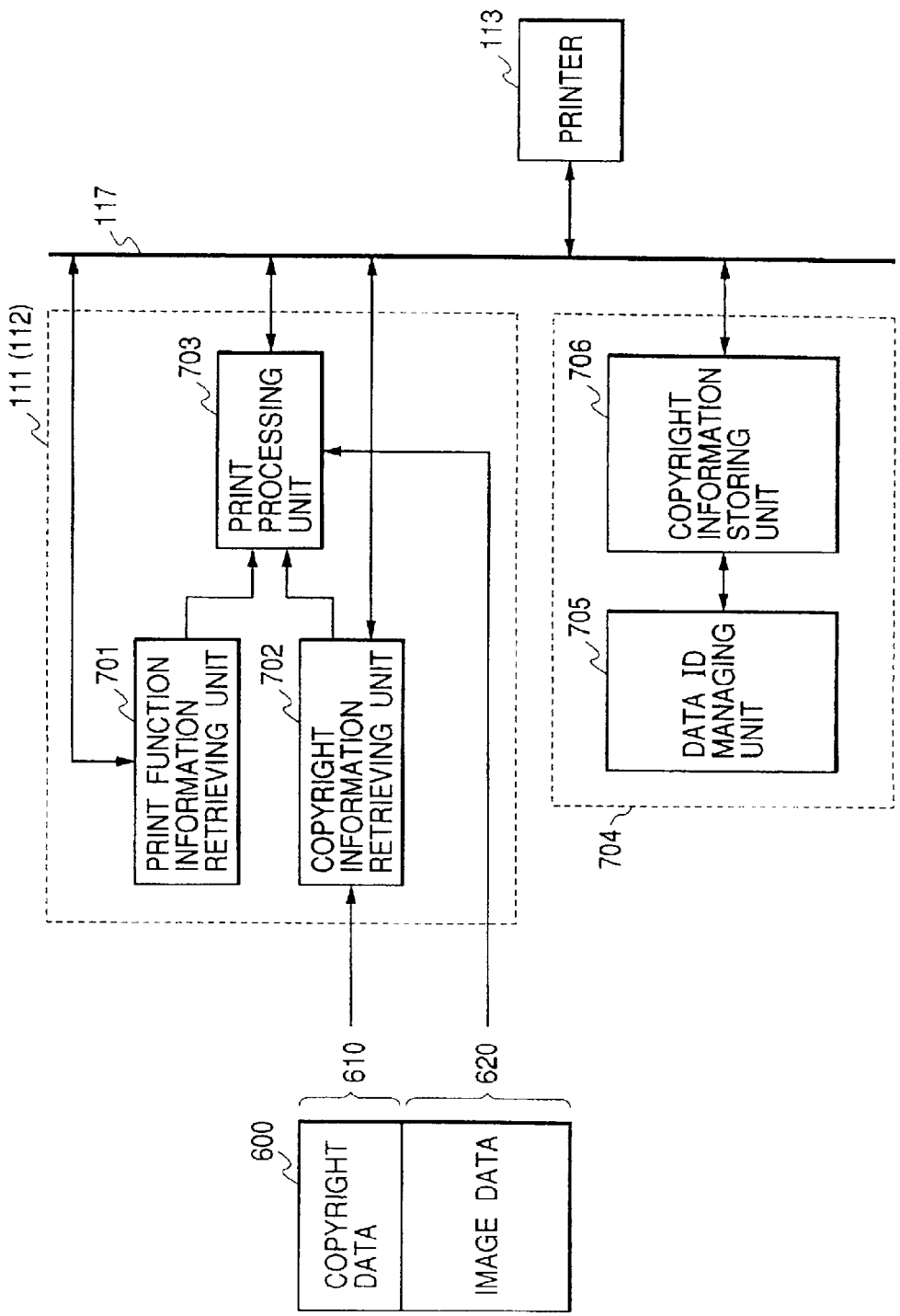
FIG. 10 is a block diagram illustrating main functions of said host computer for executing a print processing of said print data.

FIG. 10 illustrates the function configuration that the most characterizes the host computer 111 (112) executing the print processing of the print data 600 to which the copyright data 610 have been attached, as shown in the above-mentioned FIG. 8.

The host computer 111 (112) comprises a copyright information acquisition unit 702 for reading out the copyright data 610 from the print data 600, a print function information acquisition unit 701 for obtaining the function information (the printing set information and so forth) of the appliance (Herein, it is to be the printer 113 over the network 117 as one example.) for use in the print processing of the image data 620 being included in the print data 600, and a print processing unit 703 for determining the printing method based on the copyright data 610 obtained in the copyright information acquisition unit 702 and on the function information obtained in the print function information acquisition unit 701, and for executing the print processing of the image data 620 by the printer 113 over the network 117 based on the corresponding printing method.

Furthermore, over the network 117 is connected a copyright management device 704 for managing the information on the copyright of the print data 600. The copyright management device 704 comprises a data ID management unit 705 and a copyright information storage unit 706. Also, the host computer 111 is adapted to be able to connect to the copyright management device 704 by the theoretical addresses being designated in URL information 612 that are listed within the copyright data 610.

These copyright information acquisition unit 702, the printing function information acquisition unit 701, and the print processing unit 703 are the function configuration units that operate by causing the CPU 221 shown in the above-mentioned FIG. 2 to start the operating system shown in the above-mentioned FIG. 5 and the various kinds of application software.

Similarly, as with the copyright management device 704, it is configured in a similar manner to the host computers 111 and 112 as shown in FIG. 5, and the data ID management unit 705 and the copyright information storage unit 706 are the function configuration units that operate by causing the CPU 221 shown in the above-mentioned FIG. 2. to start the operating system 301 shown in the above-mentioned FIG. 5 and the various kinds of application software.

Figure 11:
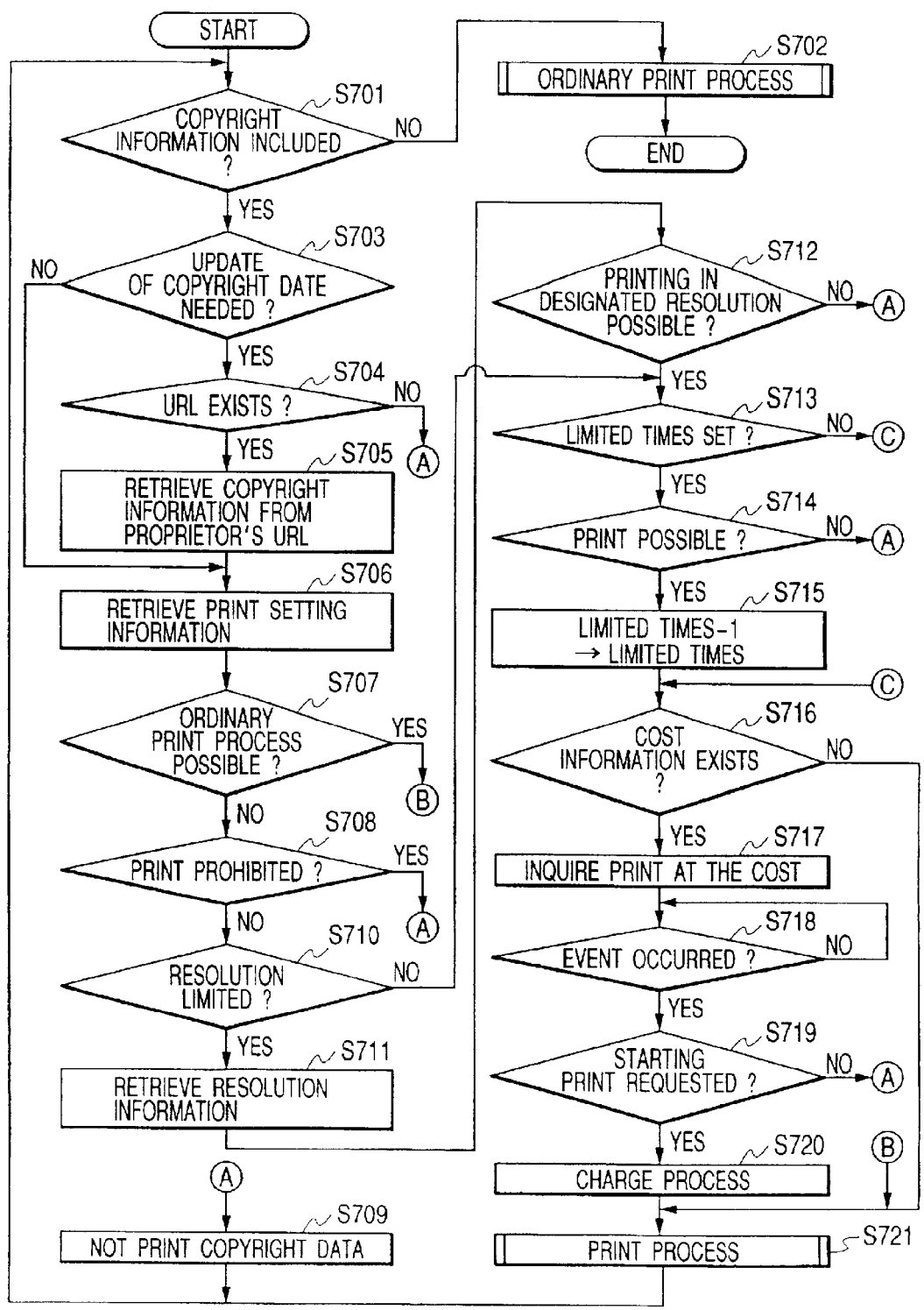
FIG. 11 is a flowchart for explaining an operation of said host computer.

FIG. 11 illustrates the operation of the host computer 111 (112) in case that by the configuration shown in above-mentioned FIG. 10, the host computer 111 (112) prints and outputs the print data 600 including the copyright data 610 by the printer 113 connected over the network 117.

In addition, as with the operation according to the flowchart of the above-mentioned FIG. 11 to be described hereinafter, it may be executed by causing the CPU 221 to start the operating system 301 or the application software 308.

Step S701:

The printer driver 310 separates the print data 600 into the copyright data 610 (Refer to the above-mentioned FIG. 8) and the image data 620 to determine whether or not the copyright data 610 have been included in the print data 600.

By this determination, in case that the copyright data 610 have not been included in the print data 600, the process then flows to step S702.

Also, by this determination, in case that the copyright data 610 has been included in the print data 600, the process then flows to step S703.

Step S702:

The printer driver 310 sends the image data 620 to the print processing unit 703 and prints the object print data 600 on the papers by the normal print output operation to finish the present process.

Step S703:

The printer driver 310 sends the copyright data 610 to the copyright information acquisition unit 702.

The copyright information acquisition unit 702 obtains the information within the date domain 615 of the copyright data 610 to determine whether or not updating of the copyright data 610 is necessary. For example, in case that the final updated day has been stored in the date domain 615, if the present date is within the predetermined period from the final updated data, it is determined that updating is not necessary, and if the present date is out of the predetermined period, it is determined that updating is necessary. Also, for example, in case that the effective limit date is stored in the date domain 615, if the present date is before the effective limit date, it is determined that updating is not necessary, and if the present date is after the effective limit date, it is determined that updating is necessary.

By this determination, if it is determined that updating is necessary, the process then flows to step S704. Also, by this determination, if it is determined that updating is not necessary, step S704 and step S705 are skipped to execute the process following step S706 using the current copyright data 610 as they are.

Step S704:

The copyright information acquisition unit 702 determines whether or not the URL information has been set to the URL domain 612 of the copyright data 610.

By this determination, in case that the URL information has been set to the URL domain 612, the process then flows to step S705.

Also, by this the determination, in case that the URL information has not been set to the URL domain 612, the next step S705 is skipped to execute the process following step S706 using the current copyright data 610 as they are.

Step S705:

The host computer 111 accesses the URL that has been set to the URL domain 612 by the network operating system 302 to connect to the copyright management device 704. And, it obtains the latest copyright information of the print data 600 from the copyright information storage unit 706, and updates the copyright data 610 by the obtained latest copyright information. Specifically, the copyright information acquisition unit 702 in FIG. 10 sends the copyright owner name 611 and the data ID 614 to the copyright management device 704 over the network 117. On the other hand, upon the copyright management device 704 receiving the copyright owner name 611 and the data ID 614, the data ID management unit 705 obtains the latest copyright information of the print data 600 that corresponds to the corresponding data ID stored in the copyright information storage unit 706 to send it to the copyright information acquisition unit 702. The received latest copyright information is notified as the updated information to the application software 308 via the operating system 301, and the application software 308 overwrites the updated information on the copyright data 610 within the print data 600. Normally, the application software 308 loads the document into the cache memory 222 and the magnetic disk memory 227, and in case that the document has been altered, it notifies the user as to whether the updated document is saved, however, in this case, it only overwrites the updated information of the copyright data 610 and does not inquire the user of confirmation on the alteration.

In addition, in case that acquisition of the latest copyright information is a failure in the present S705, in process steps following the step S706, the information of the current copyright data 610 is to be employed.

Step S706:

The copyright information acquisition unit 702 obtains the information within the printing conditions domain 613 of the copyright data 610, and simultaneously obtains the printing set information (Herein, the printing set information in the printer 113) set by the user from the printer driver 310.

Step S707:

The copyright information acquisition unit 702 compares the printing conditions being indicated by the information within the printing conditions domain 613 of the copyright data 610 with the printing set information set by the user, by this comparison, to determine whether or not the normal printing is possible.

Specifically, for example, in case that the "flag as to whether or not DO NOT PRINT" is the flag that the printing is OK, the "printable resolution range" matches the printable resolution conditions of the printer 113 being managed by the printer manager 305, no setting to the "printing restriction number" is present (=no printing restriction) and no setting to the "printing compensation information" is present (=no charge is necessary), the determination is made that [Normal printing is possible].

By this determination, in case that it has been determined that [Normal printing is possible], the process then flows to step S721 to be described later.

Also, by this determination, it has been determined that a graduation process is necessary for any item of the printing conditions domain 613 and that the normal printing is not possible, the process then flows to step S708.

Step S708:

The copyright information acquisition unit 702 determines whether or not [DO NOT PRINT] has been set to the "flag as to whether or not DO NOT PRINT" within the printing conditions domain 613.

By this determination, in case that [DO NOT PRINT] has been set, the process then flows to step S709.

Also, by this determination, in case that [DO NOT PRINT] has not been set, the process then flows to step S710.

Step S709:

The copyright information acquisition unit 702 stops the print processing operation and causes the CRT 229 to display a UI (User Interface) of the effect that [Printing is impossible due to DO NOT PRINT]. And, the process then returns to the step S701 in order to execute the process for the next print data 600.

Step S710:

The copyright information acquisition unit 702 determines whether or not [Resolution restriction] has been set to the "printable resolution range" within the printing conditions domain 613.

By this determination, in case that [Resolution restriction] has not been set for the "printable resolution range", the process from the next step S711 and step S712 is skipped to flow to the step 713 to be described later.

By this determination, in case that [Resolution restriction] has been set to the "printable resolution range", the process then flows to the step S711 to be described later.

Step S711:

The copyright information acquisition unit 702 obtains from the printer driver 310 the resolution information of the printing set information that is set by the user in advance.

Step S712:

The copyright information acquisition unit 702 compares the value of the resolution information obtained in the step S711 with the value of the resolution restriction set to the "printable resolution range" within the printing conditions domain 613 to determine whether or not the printing is possible.

By this determination, in case that it has been determined that it is the resolution by which the printing is impossible, in step S709, the copyright information acquisition unit 702 stops the print processing operation to cause the CRT 229 to display the UI of the effect that [Range of printable resolution of this writing document is xxx dpi to ooo dpi and please change set of resolution]. And, the process returns to the step S701 in order to execute the process for the next print data 600. In addition, thereafter, also in case that the user has altered the value of the resolution of the printing set information by the printer driver 310, the process then returns to the step S701 to execute the above-mentioned process again.

Also, by this determination, in case that it has been determined that it is the resolution by which the printing is possible, the process then flows to sep S713.

In addition, when the user sets the printing set information by the printer driver 310, the printable resolution of the printer 113 that has been managed in the printing function information acquisition unit 701 is notified to the user, and the user sets the resolution by selecting the desirable resolution from among the notified resolutions. In the case of the printer 114 and the digital copying machines 115 and 116, it is the same.

Step S713:

The copyright information acquisition unit 702 determines whether or not [Number of printing] has been set to the "number of printing restriction "within the printing conditions domain 613.

By this determination, in case that [Number of printing] has not been set to the "number of printing restriction", the process from the next step S714 and step S715 is skipped to flow as it is to the step S716 to be described later.

By this determination, in case that [Number of printing] has been set to the "number of printing restriction", the process then flows to the step S714.

Step S714:

The copyright information acquisition unit 702 determines whether or not the value of [Number of printing] set to the "number of printing restriction" within the printing conditions domain 613 is "0". By this determination, in case that [Number of printing] is "0", it recognizes that the printing is impossible.

Also, in case that [Number of printing] is not "0", it determines whether or not the value that is left by the number printed at this time subtracted from the corresponding [Number of printing] is more than "0". By this determination, it recognizes that the printing is impossible in case that the number of the printing restriction is under "0", and recognizes that the printing is possible in case that it is more than "0".

By this determination, in case that it has been recognized that the printing is impossible, in the foregoing step S709, the print processing operation is stopped, and the CRT229 is caused to display the effect that [It is impossible to print due to restriction to number of printing]. And, the process then returns to the step S701 in order to execute the process for the next print data 600. In addition, thereafter, also in case that the user has altered the printing volume of the printing conditions by the printer driver 310, the process then returns to the step S701 to execute the foregoing process again.

Also, by this determination, in case that it has been recognized that the printing is possible, the process then flows to the step S715.

Step S715:

The value calculated at the time of the determination in the step S714 is caused to be a new [Number of printing] to update and set "number of printing restriction". (In FIG. 11, as an example, the case is illustrated in which the printing volume of this time is [1].

Specifically, the calculated value mentioned above is notified to the application software 308 via the operating system 301 from the printer manager 305. And, the application software 308 sets this value to "number of printing restriction" of the printing conditions domain 613 of the copyright data 610. In addition, the operation of the storage of the copyright data is the same as that of the step S705.

Also, the application software 308 accesses the URL that has been set in the URL domain 612 to notify the copyright information management device 704 of the newly-set [Number of printing]. Thereafter, the process then flows to the next step S716.

In addition, the copyright information management device 704 that is notified thereof updates the corresponding copyright information stored in the copyright information storage unit 706.

Step S716:

The copyright information acquisition unit 702 determines whether or not [Compensation information] has been set to "printing compensation information" within the printing conditions domain 613.

By this determination, in case that [Compensation information] has not been set, since the charge to the copyright of the image data 620 does not occur, the process then flows to step S721 to be described later to carry out the print processing of the image data 620.

By this determination, in case that [Compensation information] has been set, the process then flows to step S717.

Figures 12, 13:
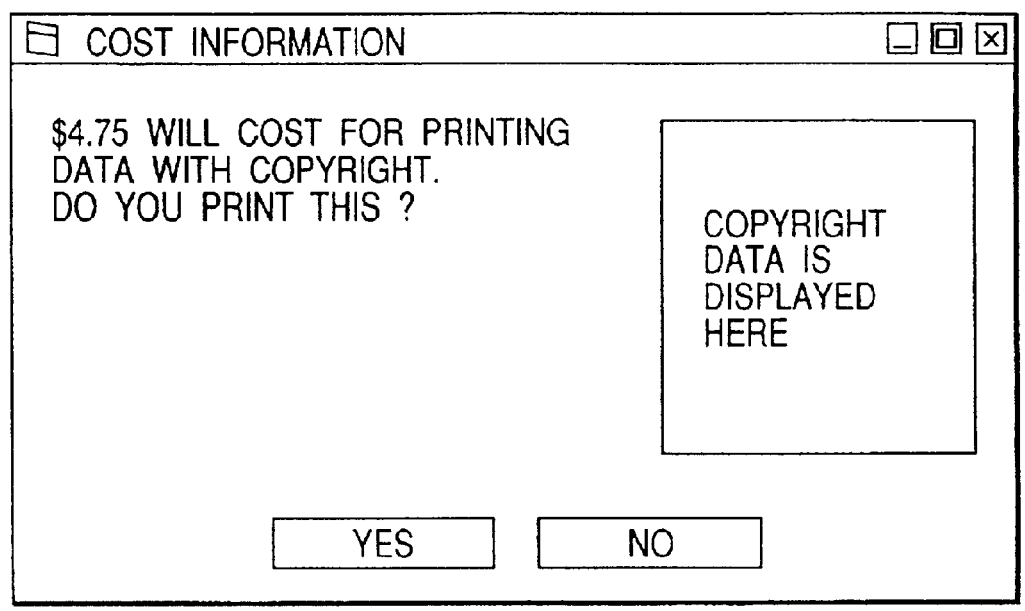
FIG. 12 is a diagram for explaining an example of a dialogue for inquiring compensation of a user in the operation of said host computer.
FIG. 13 is a diagram for explaining an example of a charge table for use in a charge process.

Step S717:

The copyright information acquisition unit 702 obtains [Compensation information] that has been set to "printing compensation information" within the printing conditions domain 613, and notifies the user of the corresponding compensation, for example, by the dialogue as shown in FIG. 12 to inquire as to whether the printing is carried out.

Step S718:

The copyright information acquisition unit 702 waits for the event from the user that responds to inquiry into the user in the step S717.

Step S719:

Upon the event of [Yes] (Please print: request of the printing commencement) or [No] (No printing) being returned from the user by the dialogue shown in FIG. 12, the copyright information acquisition unit 702 determines whether or not the corresponding event is the request of the printing commencement. By this determination, in case that it is not the request of the printing commencement, in the foregoing step S709, the print processing operation is stopped, and the CRT229 is caused to display the effect that [Printing is stopped]. And, the process then returns to the step S701 in order to execute the process for the next print data 600.

By this determination, in case that it is the request of the printing commencement, namely in case that it is the instruction by the user that he/she carries out the printing by payment of the compensation, the process then flows to step S720.

Step S720:

The process of the charge to the print processing of the image data 620 is executed.

The charge process herein, for example, is to be the preparation process using the charge table as shown in FIG. 13.

In the charge table of FIG. 13, are stored [User name] of the user carrying out the printing and [Charge status] illustrating the charge being billed to the user. In [Charge status], is stored "compensation being set to printing compensation information", for example, money converted into currency such as 13.75 dollars. In addition, in "compensation being set to printing compensation information" is to be stored the value of points by which the print processing is counted, and the points may be converted into money in a currency conversion unit (not shown) responding to the currency unit of each region.

Also, the charge table may include the volume number of the printing, the paper sizes for the printing and so forth.

Also, the corresponding charge process is executed so that the charge is billed to the user that now is printing, but the process is not limited thereto, and may be configured so that the charge to each department is possible by preserving the department code and so forth.

In addition, the printing log being prepared as described above is sent to a compensation information management unit (not shown), summed up or analyzed, and managed. This compensation information management unit may be adapted to be carried out by the operating system 301, or may be adapted to be carried out by the printer manager 305. Alternatively, the printing logs about the various appliances over the network 117 may be collectively managed over a host (not shown) that becomes a charge server over the network 117.

In the present embodiment, as one example, the printer manager 305 is caused to manage the information on the compensation based on the printing logs.

Step S721:

The print processing of the image data 620 is executed in the print processing unit 703. Thereafter, the process returns to the step S701 in order to execute the process for the next print data 600.

In addition, in the present embodiment, the print data (image data) over the host computer 111 (112) are caused to be printed and output, however, as with the print data that are the objects of this printing and outputting, for example, the various kinds of object data are applicable such as the font data, the pattern data and so forth over the host computers 111 and 112, or the printers 113 and 114, or the digital copying machines 115 and 116.

Also, needless to say, the object of the present invention can be also obtained by supplying to the system or the devices the memory media that stored the program code of the software realizing the functions of the host and the terminal of the present embodiment, and by causing the computers of the system or devices (or the CPU and the MPU) to read out and execute the program code stored in the memory media.

In this case, the program code itself red out from the memory media is caused to realize the function of the present embodiment, and the present invention finds the memory media that stored the program code in the configuration thereof. As the memory media for supplying the program code, are employed a ROM, a floppy disk, a hard disk, a optical disk, an optical magnetic disk, a CD-ROM, a CD-R, a magnetic tape, a non-volatile memory card and so forth.

Also, needless to say, the case is also included in which by executing the program code that the computers red out, the function of the present embodiment is not only realized, but also the OS and so forth that are working over the computer partially or wholly execute the actual process based on the instruction of the program code, thereby enabling the functions of the present embodiment to be realized.

Furthermore, needless to say, the case is also included in which after the program code red out from the memory media has been written into the memory being included in a function extension unit connected to a function extension board inserted into the computer or the computer, based on the instruction of the program code, the CPU and so forth being included in the function extension board or the function extension unit partially or wholly execute the actual process, thereby enabling the functions of the present embodiment to be realized.

As described above, in accordance with the present invention, by configuring so as to print the corresponding object information based on the copyright information (the information such as the copyright owner's name, the owner's URL, the resolution restriction at the time of printing, acceptance/rejection of the printing, the charge information, the restriction number of the printing and so forth) attached to the object information of the printing (the object data such as the image data and so forth), it can be surely prevented the act such as copying the data dishonestly that have the copyright and so forth, and the copyright of the printing matters can be surely protected.

Also, by configuring so as to obtain the latest copyright information to update the copyright information attached to the object information of the printing (the object data such as the image data and so forth), alteration in the copyright information can be flexibly responded. For example, it becomes possible to appropriately respond the case and so forth in which the image data became old works and the charge for them lowered.

What is claimed is:

1. A data output system including a copyright management apparatus and a data output processing apparatus which are capable of communicating via a network, wherein:

said copyright management apparatus comprises:

copyright data management means for storing copyright data related to output data in a database and managing the copyrighted data, said copyright data including information related to an effective limit date and an output condition; and wherein said output processing apparatus comprises:

first copyright data obtaining means for obtaining first copyright data attached to said output data;

determination means for determining whether or not second copyright data related to said output data should be obtained from said copyright management apparatus in accordance with the information related to the effective limit date included in the obtained first copyright data;

second copyright data obtaining means for obtaining second copyright data from said copyright management apparatus in accordance with a determination result by said determination means;

output processing means for executing output processing of said output data by utilizing one of (i) an output condition included in said second copyright data obtained by said second copyright data obtaining means and (ii) the output condition included in said first copyright data obtained by said first copyright data obtaining means, in accordance with the determination result by said determination means.

2. An information processing apparatus capable of communicating output data via a network comprising:

first copyright data obtaining means for obtaining first copyright data attached to said output data, said copyright data including information related to an effective limit date and an output condition;

determination means for determining whether or not second copyright data related to said output data should be obtained from a copyright management apparatus in accordance with the information related to the effective limit date included in the obtained first copyright data;

second copyright data obtaining means for obtaining said second copyright data from the copyright management apparatus in accordance with a determination result of said determination means; and output processing means for executing output processing of said output data by utilizing one of (i) an output condition included in said second copyright data obtained by said second copyright data obtaining means, and (ii) the output condition included in said first copyright data obtained by said first copyright data obtaining means, in accordance with the determination result of said determination means.

3. An apparatus according to claim 2, wherein the information related to the effective limit date indicates a date when a predetermined period elapsed from a final updated date of said copyright data.

4. An apparatus according to claim 2, wherein said output processing means executes the output processing of said output data by utilizing the output condition included in said first copyright data if said second copyright data cannot be obtained by said second copyright data obtaining means.

5. An apparatus according to claim 2, wherein said copyright data further includes compensation information, and said apparatus further comprises output log preparation means for preparing an output log on the basis of the compensation information.

6. The information processing device according to claim 5, wherein said compensation information is points that correspond to said output process, further comprising:

currency conversion means for converting said points into currency units, wherein said output log preparation means convert said points into currency units by said currency conversion means to prepare the output logs.

7. The information processing device according to claim 5, further comprising:

output log management means for summing up and analyzing the output logs prepared by said output log preparation means.

8. An information processing apparatus capable of communicating output data via a network, said method comprising;

a first copyright data obtaining step of obtaining first copyright data attached to said output data, said copyright data including information related to an effective limit date and an output condition;

a determination step of determining whether or not a second copyright data related to said output data should be obtaining from a copyright management apparatus in accordance with the information related to the effective limit date included in the obtained first copyright data;

a second copyright data obtaining step of obtaining said second copyright data from said copyright management apparatus in accordance with a determination result of said determination step; and an output processing step of executing output processing of said output data by utilizing one of (i) an output condition included in said second copyright data obtained in said second copyright data obtaining step, and (ii) the output condition included in said first copyright data obtained in said first copyright data obtaining step in accordance with the determination result of said determination step.

9. A memory medium storing a computer-readable program for controlling an information processing apparatus capable of communicating output data via a network using a method comprising;

a first copyright data obtaining step of obtaining first copyright data attached to said output data, said copyright data including information related to an effective limit date and an output condition;

a determination step of determining whether or not second copyright data related to said output data should be obtained from a copyright management apparatus in accordance with the information related to the effective limit date included in the obtained first copyright data;

a second copyright data obtaining step of obtaining said second copyright data from said copyright management apparatus in accordance with a determination result of said determination step; and an output processing step of executing output processing of said output data by utilizing one of (i) an output condition included in said second copyright data obtained in said second copyright data obtaining step, and (ii) the output condition included in said first copyright data obtained in said first copyright data obtaining step, in accordance with the determination result of said determination step.

* * * * *

UNITED STATES PATENT AND TRADEMARK OFFICE
CERTIFICATE OF CORRECTION

PATENT NO. : 6,925,498 B2  Page 1 of 2
DATED : August 2, 2005
INVENTOR(S) : Yasuhiro Kajirai It is certified that error appears in the above-identified patent and that said Letters Patent is hereby corrected as shown below:

<u>Title page, Item [54] and Column 1, line 3,</u>
Title, "THEROF" should read -- THEREOF --.

<u>Title page,</u>
Item [74], *Attorney, Agent, or Firm*, "Cella" should read -- Cella, --.

<u>Column 1,</u>
Line 28, "objectivity" should read -- objective --.
Line 36, "upon a" should read -- upon --.

<u>Column 2,</u>
Line 22, "an local" should read -- a local --.

<u>Column 3,</u>
Line 12, "switch" should read -- switched --.
Line 35, "via a" should read -- via an --.
Line 37, "coping" should read -- copying --.

<u>Column 4,</u>
Line 27, "switch" should read -- switched --.

<u>Column 5,</u>
Line 2, "comprises" should read -- comprise --.
Lines 8, 39 and 61, "case" should read -- a case --.

<u>Column 10,</u>
Line 50, "These" should read -- The --.
Line 66, "case" should read -- a case --.

<u>Column 11,</u>
Lines 13, 16, 30, 36 and 51, "case" should read -- a case --.
Line 54, "this the" should read -- this -- and "case" should read -- a case --.

<u>Column 12,</u>
Lines 14, 20, 37, 46, 58 and 60, "case" should read -- a case --.
Line 16, "saved," should read -- saved; --.

<u>Column 13,</u>
Lines 8, 12, 26, 34, 38, 54, 58 and 65, "case" should read -- a case --.
Line 11, "step 713" should read -- step S713 --.

UNITED STATES PATENT AND TRADEMARK OFFICE
CERTIFICATE OF CORRECTION

PATENT NO. : 6,925,498 B2
DATED : August 2, 2005
INVENTOR(S) : Yasuhiro Kajirai

It is certified that error appears in the above-identified patent and that said Letters Patent is hereby corrected as shown below:

<u>Column 14,</u>
Lines 1, 6, 7, 9, 15, 19, 49 and 54, "case" should read -- a case --.
Line 27, "[1]." should read -- [1].) --.

<u>Column 15,</u>
Lines 6, 13 and 14, "case" should read -- a case --.

<u>Column 16,</u>
Lines 9, 19 and 27, "red" should read -- read --.
Line 15, "a optical" should read -- an optical --.

Signed and Sealed this

Sixth Day of June, 2006

JON W. DUDAS
*Director of the United States Patent and Trademark Office*